US011886218B2

(12) United States Patent
Wang et al.

(10) Patent No.: US 11,886,218 B2
(45) Date of Patent: Jan. 30, 2024

(54) ONE-HANDED JOYSTICK FOR CRANES

(71) Applicants: ZOOMLION Heavy Industry NA, Inc., Yorkville, WI (US); ZOOMLION Heavy Industry Science and Technology Co. Ltd., Changsha (CN)

(72) Inventors: Shu Wang, Yorkville, WI (US); Hruturaj V. Vartak, New Berlin, WI (US)

(73) Assignees: ZOOMLION HEAVY INDUSTRY NA, INC., Yorkville, WI (US); ZOOMLION HEAVY INDUSTRY SCIENCE AND TECHNOLOGY CO. LTD, Changsha (CN)

( * ) Notice: Subject to any disclaimer, the term of this patent is extended or adjusted under 35 U.S.C. 154(b) by 0 days.

(21) Appl. No.: 17/974,594

(22) Filed: Oct. 27, 2022

(65) Prior Publication Data

US 2023/0059276 A1 Feb. 23, 2023

Related U.S. Application Data

(63) Continuation-in-part of application No. 17/704,405, filed on Mar. 25, 2022, now abandoned, which is a continuation-in-part of application No. 17/404,262, filed on Aug. 17, 2021, now Pat. No. 11,449,089.

(51) Int. Cl.

*G05G 9/04* (2006.01)
*E02F 9/20* (2006.01)

(Continued)

(52) U.S. Cl.

CPC ............. *G05G 9/047* (2013.01); *B66C 13/56* (2013.01); *E02F 9/2004* (2013.01);

(Continued)

(58) Field of Classification Search

CPC ............... G05G 9/047; G05G 9/04737; G05G 2009/04748; G05G 2009/04774;

(Continued)

(56) References Cited

U.S. PATENT DOCUMENTS 5,223,776 A 6/1993 Radke et al.
5,389,752 A * 2/1995 Karbassi .................. H01H 3/04 200/61.85

(Continued)

FOREIGN PATENT DOCUMENTS

WO WO 2007/144629 12/2007

*Primary Examiner* — Adam D Rogers
(74) *Attorney, Agent, or Firm* — Donald J. Ersler

(57) ABSTRACT

A one-handed joystick for cranes allows an operator to make all necessary motions with a single hand and arm for manipulating various components of a crane. The one-handed joystick includes a rotatable cylinder bar, a rotatable ring, an industrial joystick base, a rocker switch and at least two push button switches. Motions of the rotatable cylinder bar, the rotatable ring, the industrial base and the rocker switch are used to raise and lower the auxiliary hoist; raise and lower the telescopic boom for luffing a hoist; raise and lower the main hoist; slew the boom base in a clockwise or counterclockwise direction; and extend or retract the telescoping boom. The speed of main and auxiliary hosts may be changed with the two push button switches. A Deadman's switch may be installed on a back side of the rotatable cylinder bar.

19 Claims, 16 Drawing Sheets

(51) Int. Cl.
*B66C 13/56* (2006.01)
*G05G 9/047* (2006.01)

(52) U.S. Cl.
CPC .. *E02F 9/2012* (2013.01); *G05G 2009/04744* (2013.01); *G05G 2009/04748* (2013.01); *G05G 2009/04774* (2013.01); *G05G 2009/04781* (2013.01)

(58) Field of Classification Search
CPC ......... G05G 2009/04781; H01H 25/04; H01H 2025/043; H01H 2025/045; B60K 2026/029; E02F 9/2004; E02F 9/2012; B66C 13/56
See application file for complete search history.

(56) References Cited

U.S. PATENT DOCUMENTS

| | | | | |
|---|---|---|---|---|
| 6,892,481 | B2 * | 5/2005 | Yamamoto | G05G 9/047 345/161 |
| 7,113,836 | B2 | 9/2006 | Hornig | |
| 7,293,625 | B2 * | 11/2007 | Kumazawa | F15B 13/0422 74/471 XY |
| 8,276,476 | B2 * | 10/2012 | Diccion | E02F 9/2004 180/315 |
| 2002/0166267 | A1 * | 11/2002 | McGugan | E02F 9/2004 37/348 |
| 2023/0056028 | A1 * | 2/2023 | Seeger | E02F 9/2008 |
| 2023/0221752 | A1 * | 7/2023 | Wang | E02F 9/2008 74/491 |

* cited by examiner

SAE PATTERN

ISO PATTERN

| Hand Motion | Excavator Motion | |
|---|---|---|
| | SAE Example | ISO Example |
| Wrist Curl In (Flexion) | Bucket Curl | |
| Wrist Curl Out (Extension) | Bucket Dump | |
| Forearm Push Forward | Stick Extension | Boom Extension (Raise) |
| Forearm Pull Rearward | Stick Retraction | Boom Retraction (Lower) |
| Hand Move Left | Swing Left | |
| Hand Move Right | Swing Right | |
| Hand Twist CW | Boom Extension (Raise) | Stick Extension |
| Hand Twist CCW | Boom Retraction (Lower) | Stick Retraction |

FIG. 10

ONE-HANDED JOYSTICK FOR CRANES

CROSS-REFERENCES TO RELATED APPLICATIONS

This is a continuation-in-part patent application, which takes priority from patent application Ser. No. 17/704,405, filed on Mar. 25, 2022, which takes priority from patent application Ser. No. 17/404,262, filed on Aug. 17, 2021.

BACKGROUND OF THE INVENTION

Field of the Invention

The present invention relates generally to heavy equipment and more specifically to a one-handed joystick for cranes, which includes a rotatable ring and a rotatable cylinder bar, which include motions that more closely resemble the motions of a crane for operators with limited or no experience.

Discussion of the Prior Art

Existing SAE joystick motion patterns and ISO joystick motion patterns for controlling an excavator require a steep learning curve for new operators. The existing motions are not are not very intuitive for two hand operation. Many of the joystick motions do not mimic the motion of an excavator. The most-used existing control patterns for excavators are described in FIGS. 8 & 9. Further, the existing SAE joystick patterns and ISO joystick patterns are based on utilizing two joysticks. A specially designed joystick would allow the operator to execute additional motion commands not possible with current joysticks. U.S. Pat. No. 5,223,776 to Radke et al. discloses a six-degree virtual pivot controller. U.S. Pat. No. 7,113,836 to Hornig discloses a control device for maneuvering an apparatus. Patent document no. WO 2007/144629 to Clough et al. discloses a control system for earth moving and working apparatus.

Different types of cranes, such as mobile, rough terrain or all terrain cranes are equipped with electrical joysticks and foot pedals to control movement and motion systems to implement lifting a work load. Traditionally, two joysticks are used to operate the crane to manipulate motion of main motion systems. The system motions include slewing (SL), auxiliary hoisting (AH), luffing (LF) and main hoisting (MH) as shown in FIG. 15. The two joysticks are used for moving the crane forward, backward, rightward and leftwards and are associated with each motion including hoisting up and down, slewing clockwise and counter-clockwise and luffing upward and downward. An important movement of mobile cranes is using a two directional foot pedal to control a telescoping system (TS) for a boom as shown in FIG. 16. When the two directional foot pedal is pressed forward, the telescoping system extends the boom. When the two directional pedal is pressed rearward, the boom retracts.

Accordingly, there is clearly felt need in the art for a one-handed joystick for cranes, which includes a rotatable ring and a rotatable cylinder bar, which include motions that more closely resemble the motions of a crane for operators with limited or no experience; which allow two joysticks to be replaced with a single joystick; and which replaces a foot pedal with a rocker switch.

SUMMARY OF THE INVENTION

The present invention provides a one-handed joystick for cranes, which makes motions of the joystick more closely resemble the motions of a crane for an operator with limited or no experience. One-handed joystick for excavators (improved joystick) preferably includes a state-of-the art joystick base for heavy equipment (industrial joystick base), which includes two axis functionality and a rotary upper handle. The rotary upper handle preferably includes an outer base ring, a rotatable ring, a position sensor and a base portion. The base portion extends downward from a bottom of the outer base ring. A bottom of the base portion is engaged with a top of the industrial joystick base. The rotatable ring is rotatably retained in an inner perimeter of the outer base ring. The outer base ring preferably includes opposing grooves for preventing axially movement of the rotatable ring. One of the opposing grooves is preferably retained in detachable ring. The detachable ring is secured to one side of the outer base ring with any suitable attachment method, such as fasteners, a bonding agent, a snap arrangement or any other suitable attachment method.

A sensor cavity is formed in an inner perimeter of the outer base ring, below the grooves for receiving the rotatable ring. The position sensor is preferably a PCAP (projective capacitive) touch sensor. However, other types of sensors may also be used. The rotatable ring preferably includes a ring portion and a rotatable cylinder bar. The ring portion preferably includes two halves. A pair of opposing bosses preferably extend inward from an inner perimeter of the ring portion. A through hole is formed through the pair of opposing bosses. The rotatable cylinder bar includes an inner diameter. The inner diameter of the rotatable cylinder bar is sized to rotatably receive an outer diameter of the pair of opposing bosses. A contact plug is preferably pressed into the inner diameter of the rotatable cylinder bar. However, the contact plug may be molded into the inner perimeter of the rotatable cylinder bar. The contact plug includes a biased center conductive contact and a biased peripheral conductive contact. The heights of the center and peripheral conductive contacts are equal. It is preferable to use a compression spring to bias the center and peripheral conductive contacts outward to contact the position sensor. The ring portion with the rotatable cylinder bar retained therein is inserted into the inner perimeter of the outer base ring. The detachable ring is secured to one side of the outer base ring. The center and peripheral conductive contacts must make physical contact with the position sensor.

The wiring from the position sensor may be run down a side of the outer base ring or molded into rotary upper handle. The wiring is connected to a suitable ring controller for determining the location of the rotatable cylinder bar and the rotatable ring. The position sensor includes a grid arrangement, which allows a rotational position and an angular position of the two-spring loaded conductive contacts to be determined. When the rotatable cylinder bar is rotated in either a clockwise or counterclockwise direction, the center conductive contact will remain relatively stationary, while the peripheral conductive contact will rotate about the center conductive contact. The rotational motion of the rotatable cylinder bar will be picked-up by the ring controller and could be used to control curling or dumping of a bucket. When the rotatable ring is rotated in either a clockwise or counterclockwise direction the angular motion will be picked-up by the ring controller and could be used to control boom-up or boom-down.

The improved joystick allows an operator to make all the necessary motions with a single hand and arm for manipulating an excavator tool. The improved joystick includes the rotatable cylinder bar, the rotatable ring and the industrial joystick base. To start the operation, a hand grasps the rotatable cylinder bar. The rotatable cylinder bar may be rotated in opposite directions. The rotatable ring may be rotated in a clockwise or counterclockwise motion. The industrial base may be moved in a front to back or left to right. Associating a downward hand curl is analogous to a bucket digging motion. An upward hand curl is analogous to a bucket dump. A forearm forward push is analogous to a boom/stick extension. A forearm reward pull is analogous to a boom/stick retraction. A hand movement to the left is analogous to swinging the excavator left. A hand movement to the right is analogous to swinging the excavator right. A clockwise hand twist is analogous to a stick/boom extension. A counter clockwise hand twist is analogous to a stick/boom retraction.

The one-handed joystick for cranes allows an operator to make all the necessary motions with a single hand and arm for manipulating a crane. The one-handed joystick preferably includes the rotatable cylinder bar, the rotatable ring, the industrial joystick base, a rocker switch and at least two push button switches. The rocker switch preferably has three positions, which are retract, off and extend. The following motion parameters are given by way of example and not by way of limitation. The auxiliary hoist is preferably raised by an upward hand curl of the rotatable cylinder bar and lowered by a downward hand curl of the rotatable cylinder bar. Raising the boom during luffing is preferably implemented by rotating the rotatable ring to the left and lowering the boom during luffing is implemented by rotating the rotatable ring to the right. The main hoist is preferably raised by pivoting the industrial joystick base rearward and the main hoist is preferably lowered by pivoting industrial joystick base frontward.

Slewing a boom base in a counterclockwise motion is preferably implemented by pivoting the industrial joystick base to the left. Slewing the boom base in a clockwise motion is implemented by pivoting the industrial joystick to the right. Extending the telescoping boom is preferably implemented by toggling the rocker switch from an off position to the extend position. Retracting the telescoping boom is implemented by toggling the rocker switch from an off position to the retract position. Replacing a foot pedal with a rocker switch saves significant costs, including the foot pedal and harness layout to the foot pedal of the crane. A first push button switch is preferably used to set a low-speed mode for raising and lower the main and auxiliary hoists. A second push button switch is used to set a fast-speed mode for raising and lowering the main hoist and the auxiliary hoist. The first and second push button switches are preferably located adjacent the rocker switch. A Deadman's switch may be located on a side opposite the rocker switch and the push button switches on the rotatable cylindrical bar.

To start the one-handed joystick operation, a hand grasps the rotatable cylinder bar. The rotatable cylinder bar may be rotated in opposite directions. The rotatable ring may be rotated in a clockwise or counterclockwise motion. The industrial base may be moved front to back or left to right. In addition, some critical safeties can be limited and guaranteed by the One-hand joystick control mechanism as well. The one-handed joystick may be operated by an operator with only one hand, or someone who is paralyzed on one side of their body.

Accordingly, it is an object of the present invention to provide a joystick having increased control functionality with a unique moving structure, which allows more functions to be performed by one hand.

It is another object of the present invention to provide a one-handed joystick for excavators, which makes motions of the joystick more closely resemble the motions of an excavator for an operator with limited or no experience.

Finally, it is another object of the present invention to provide a one-handed joystick for excavators, which allows a foot pedal to be replaced with a rocker switch.

These and additional objects, advantages, features and benefits of the present invention will become apparent from the following specification.

BRIEF DESCRIPTION OF THE DRAWINGS

FIG. 10 is a table of hand and forearm motions associated with movements of an excavator of an improved joystick in accordance with the present invention.

DETAILED DESCRIPTION OF THE PREFERRED EMBODIMENTS

Figure 1:
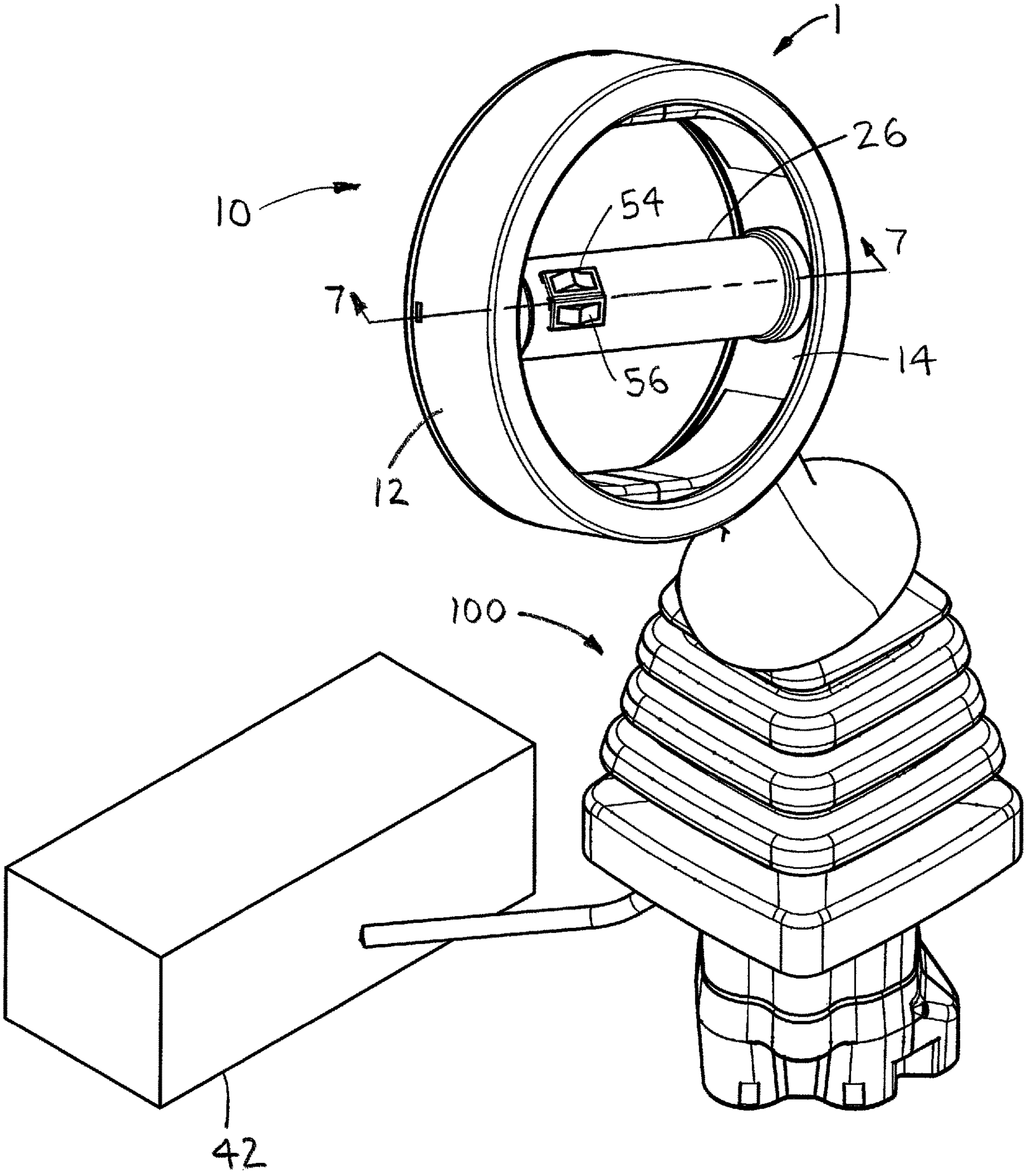
FIG. 1 is a perspective view of an improved joystick in accordance with the present invention.
Figure 2:
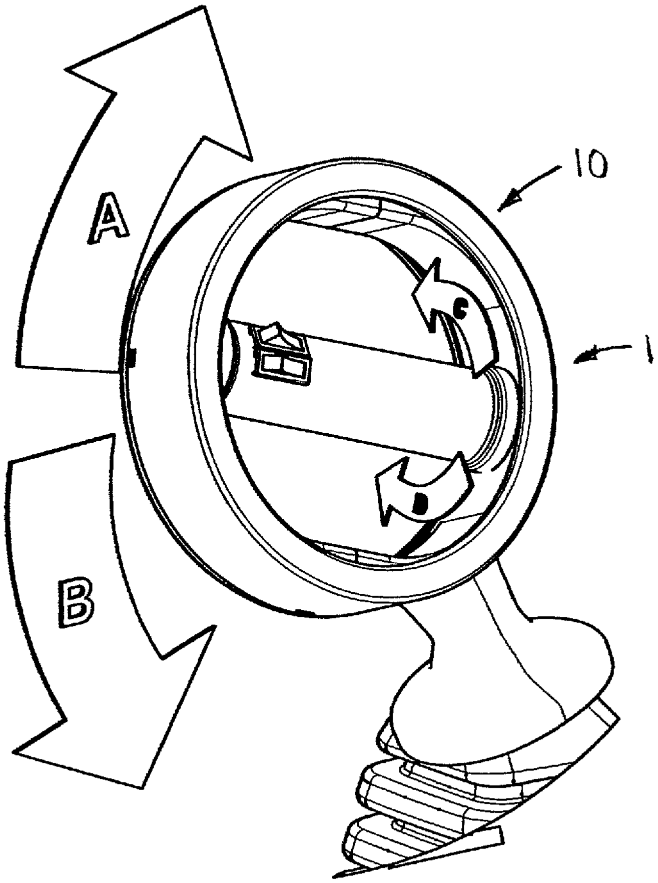
FIG. 2 is a perspective view of an improved joystick illustrating rotation of a ring portion and a rotatable cylinder bar in accordance with the present invention.
Figure 3:
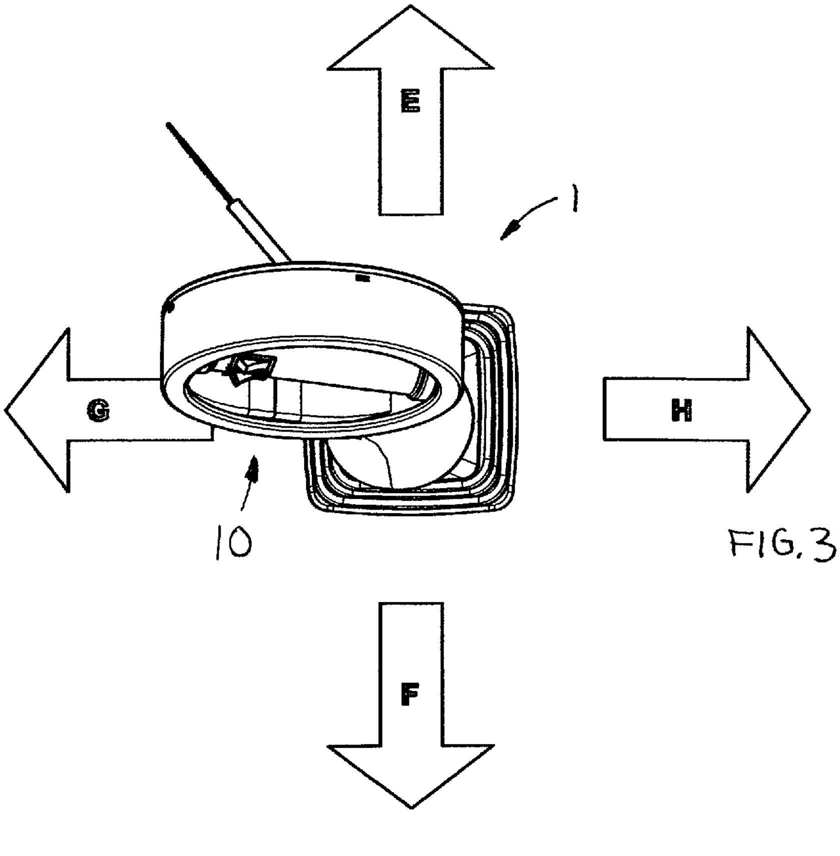
FIG. 3 is a perspective view of an improved joystick illustrating x-axis motion and y-axis motion of a rotary upper handle in accordance with the present invention.
Figure 4:
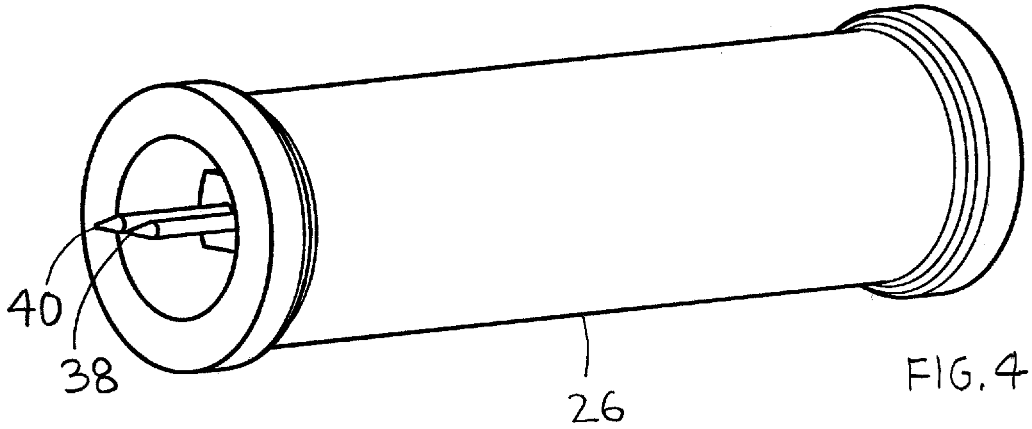
FIG. 4 is a perspective view of a rotatable cylinder bar of an improved joystick in accordance with the present invention.
Figure 5:
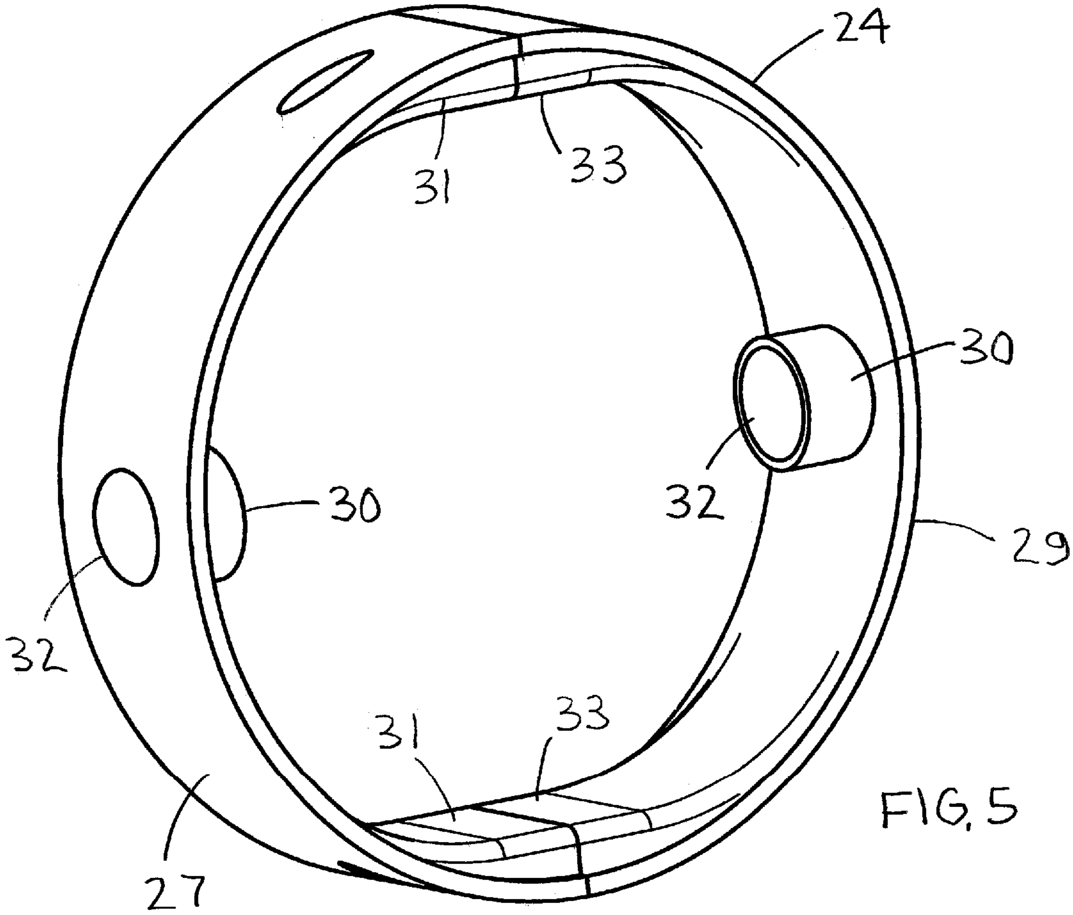
FIG. 5 is a perspective view of a ring portion of an improved joystick in accordance with the present invention.
Figure 6:
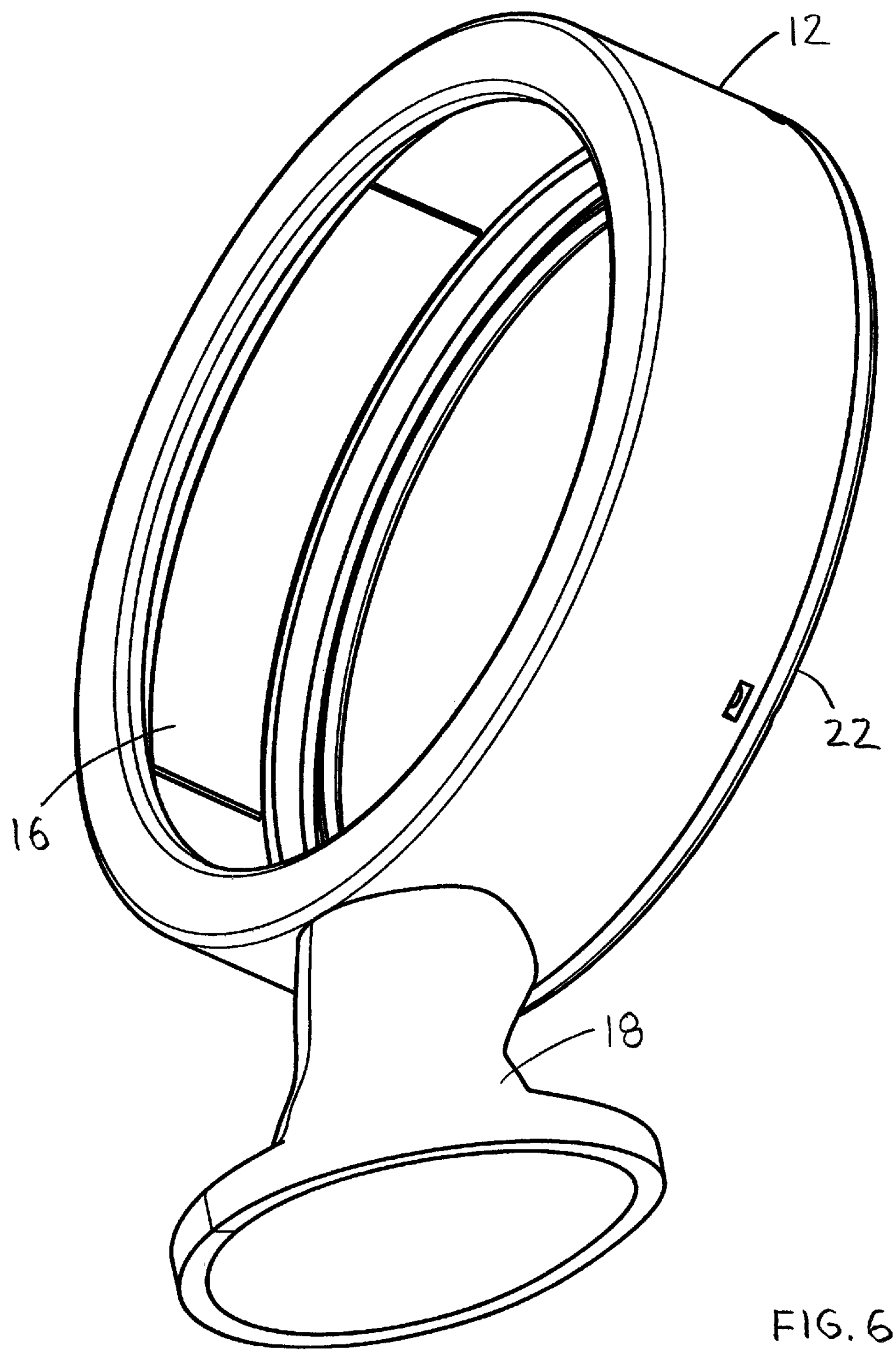
FIG. 6 is a perspective view of an outer base ring of an improved joystick in accordance with the present invention.
Figure 7:
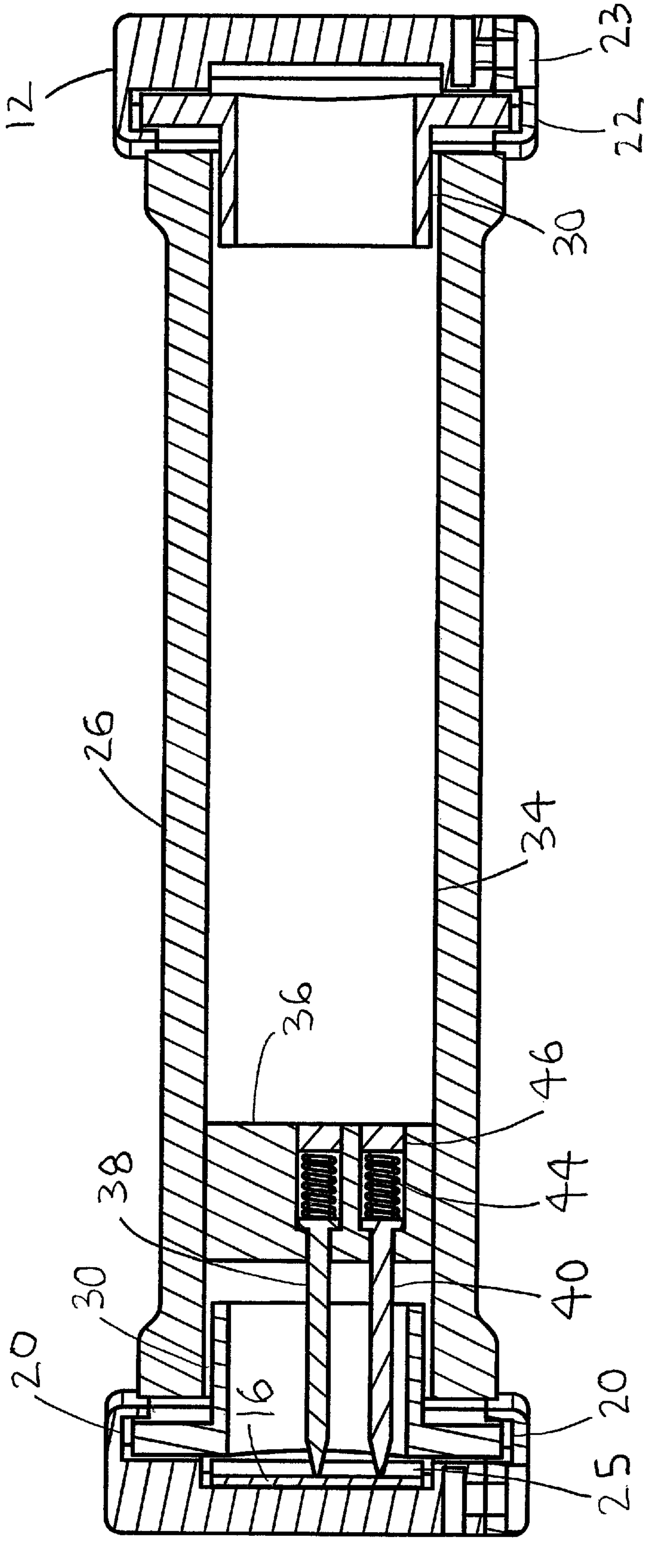
FIG. 7 is a cross-sectional view of a rotary upper handle of an improved joystick in accordance with the present invention.

With reference now to the drawings, and particularly to FIG. 1, there is shown a perspective view of an improved joystick 1. With reference to FIGS. 2-3, the improved joystick 1 preferably includes a state-of-the art joystick base for heavy equipment (industrial joystick base) 100 with x-axis and y-axis movement, and a rotary upper handle 10. There are numerous ways in the art of implementing a two-axis joystick. Therefore, a further explanation of the operation of a two-axis joystick is not necessary.

With reference to FIGS. 4-7, the rotary upper handle 10 preferably includes an outer base ring 12, a rotatable ring 14, a position sensor 16 and a base portion 18. A bottom of the base portion 18 extends from a top of the industrial joystick base 100. The outer base ring 12 extends upward from a top of the base portion 18. The rotatable ring 14 is rotatably retained in an inner perimeter of the outer base ring 12. The outer base ring 12 preferably includes a pair of opposing grooves 20 for preventing axial movement of the rotatable ring 14. One of the opposing grooves 20 is preferably retained in a detachable ring 22. The detachable ring 22 is secured to one side of the outer base ring with any suitable attachment device, such as a plurality of fasteners 23, a bonding agent, snap arrangement or any other suitable attachment method.

A sensor cavity 25 is formed in an inner perimeter of the outer base ring 12 and below a bottom of the pair of opposing grooves 20 for receiving the position sensor 16. The position sensor 16 is preferably a PCAP (projective capacitive) touch sensor. However, other types of sensors may also be used. The position sensor 16 must be curved along a lengthwise axis or be flexible to conform to an inner perimeter of the sensor cavity 25. The rotatable ring 14 preferably includes a ring portion 24 and a rotatable cylinder bar 26. A pair of opposing bosses 30 preferably extend inward from an inner perimeter of the ring portion 24. A through hole 32 is formed through the pair of opposing bosses 30.

The ring portion 24 preferably includes first and second halves 27, 29. Each end of the first half 27 includes an attachment area 31 for attaching an opposing half. Each end of the second half 29 includes an attachment area 33 for attaching an opposing half. The first and second halves 27, 29 may be attached to each other with fasteners, adhesive, snaps or any other suitable attachment method. A pair of opposing bosses 30 preferably extend inward from an inner perimeter of the ring portion 24. A through hole 32 is formed through the pair of opposing bosses 30. The rotatable cylinder bar 26 includes an inner diameter 34. The inner diameter 34 of the rotatable cylinder bar 26 is sized to rotatably receive an outer diameter of the pair of opposing bosses 30. A contact plug 36 is preferably pressed into the inner diameter 34 of the rotatable cylinder bar 26. However, the contact plug 36 may be molded into the inner perimeter of the rotatable cylinder bar 26. The contact plug 36 preferably includes a biased center conductive contact 38 and a biased peripheral conductive contact 40. However, the contact plug 36 may only include a center conductive contact 38, if an electrical output from the rotatable cylinder bar 26 is not needed. A compression spring 44 and set screw 46 are preferably used to bias the center and peripheral conductive contacts against the position sensor 16. The heights of the center and peripheral conductive contacts 38, 40 are equal.

The ring portion 24 with the rotatable cylinder bar 26 retained therein is inserted into the inner perimeter of the outer base ring 12. The detachable ring 22 is secured to one side of the outer base ring 12 with the plurality of fasteners 23. Sensor wiring (not shown) from the position sensor 16 is run down a side of the outer base ring 12 or molded into the rotary upper handle 10. However, the ring portion 24 may not rotate relative to the outer base ring 12 for some applications. The rotatable cylinder bar 26 would rotate with the center and peripheral conductive contacts 38, 40. The sensor wiring is connected to a suitable ring controller 42 for determining the location of the rotatable cylinder bar 26 and the ring portion 24. The position sensor 16 includes a grid arrangement, which allows a rotational position and an angular position of the ring portion 24 and the rotatable cylinder bar 26 to be determined. When the rotatable cylinder bar 26 is rotated in either a clockwise or counterclockwise direction, the center conductive contact 38 will remain relatively stationary, while the peripheral conductive contact 40 will rotate about the center conductive contact 38. The rotational motion of the rotatable cylinder bar 26 will be picked-up by the ring controller 42 and could be used to control curling or dumping of a bucket. When the rotatable ring 14 is rotated in either a clockwise or counterclockwise direction the angular motion will be processed by the ring controller 42 and could be used to control boom-up or boom-down. Movement of the rotary upper handle 10 in the X-axis and the Y-axis will also be processed by the ring controller 42 and used to operate the appropriate attachment. Buttons, toggle switches, thumb wheels and other control devices may also be added to the rotary upper handle 10.

Figure 8:
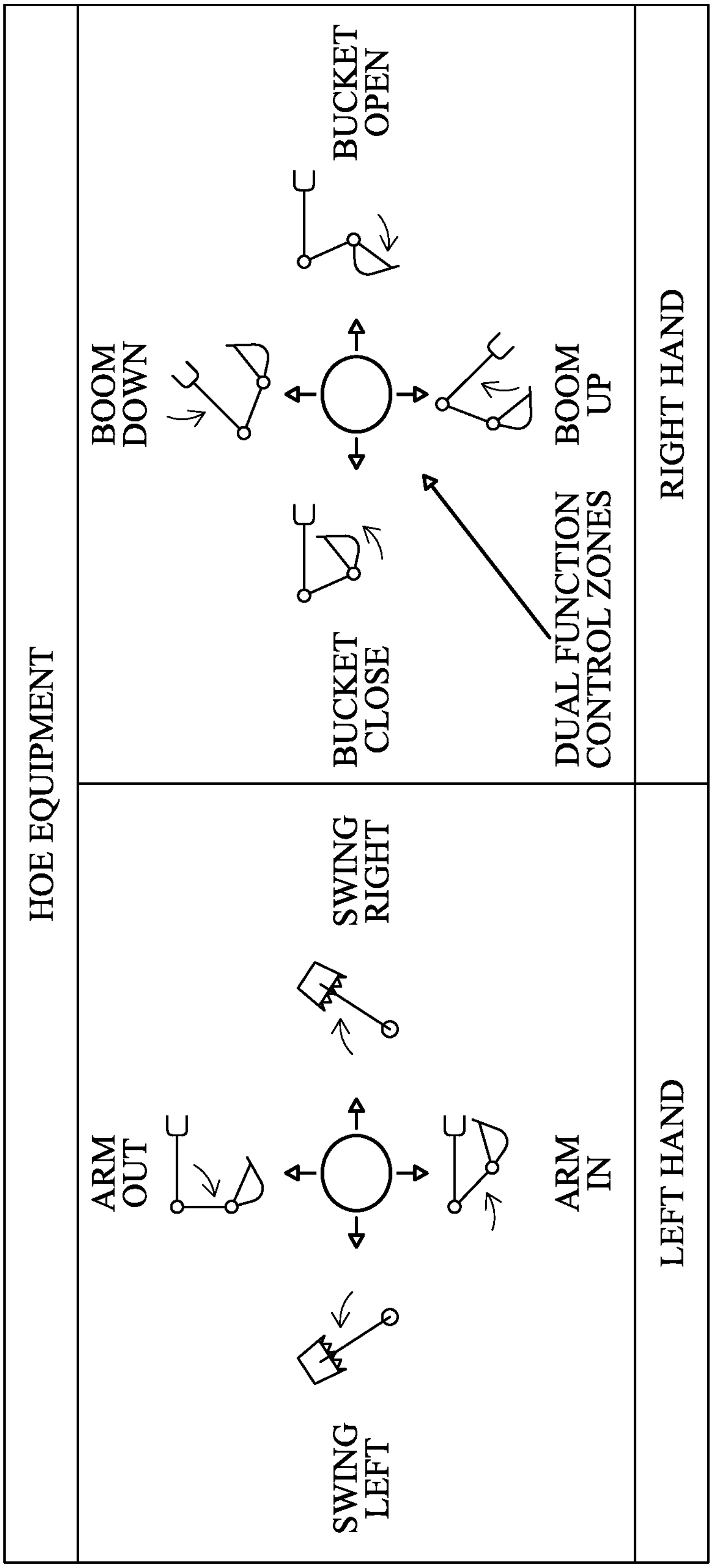
FIG. 8 (PRIOR ART)
FIG. 8 is a schematic diagram of left and right SAE joystick motion patterns.
Figure 9:
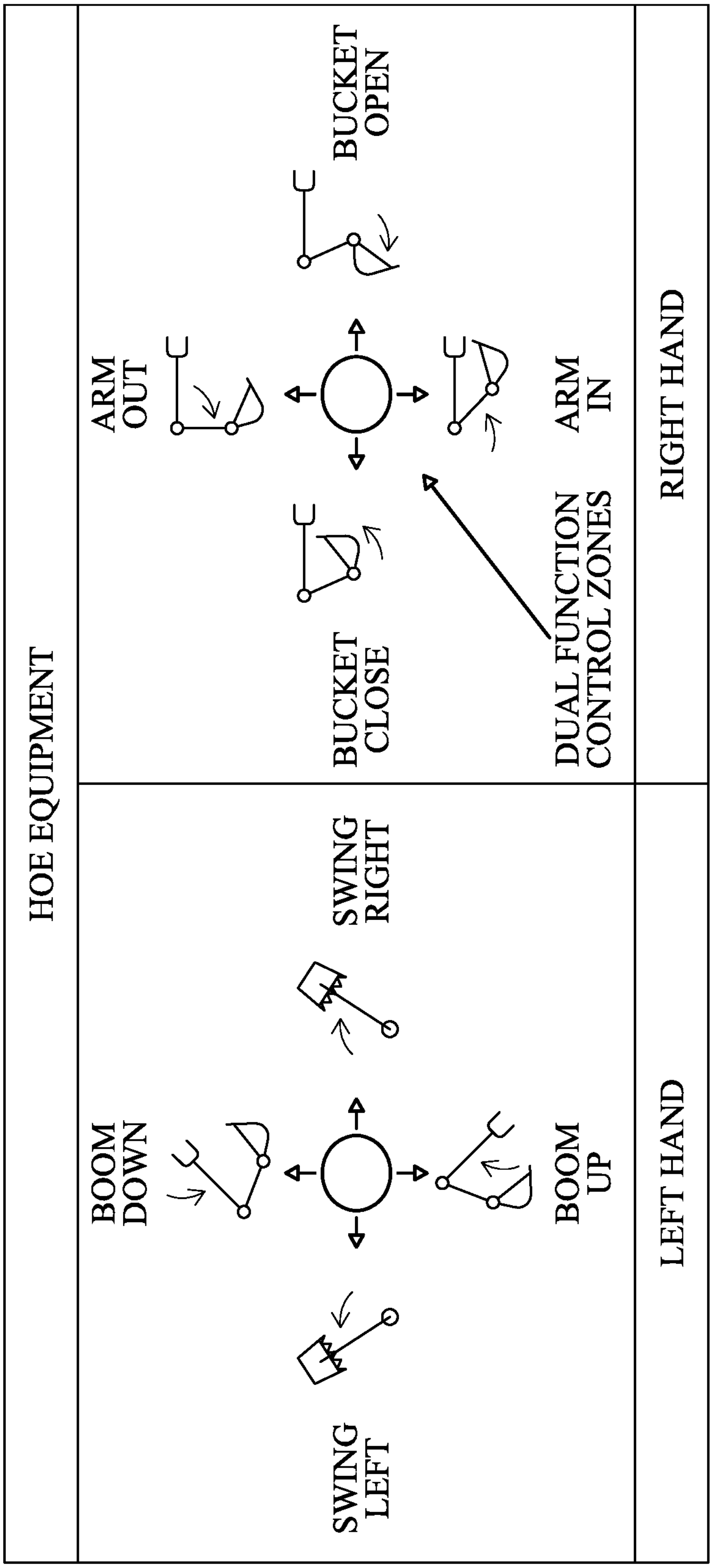
FIG. 9 (PRIOR ART)
FIG. 9 is a schematic diagram of left and right ISO joystick motion patterns.
Figure 11:
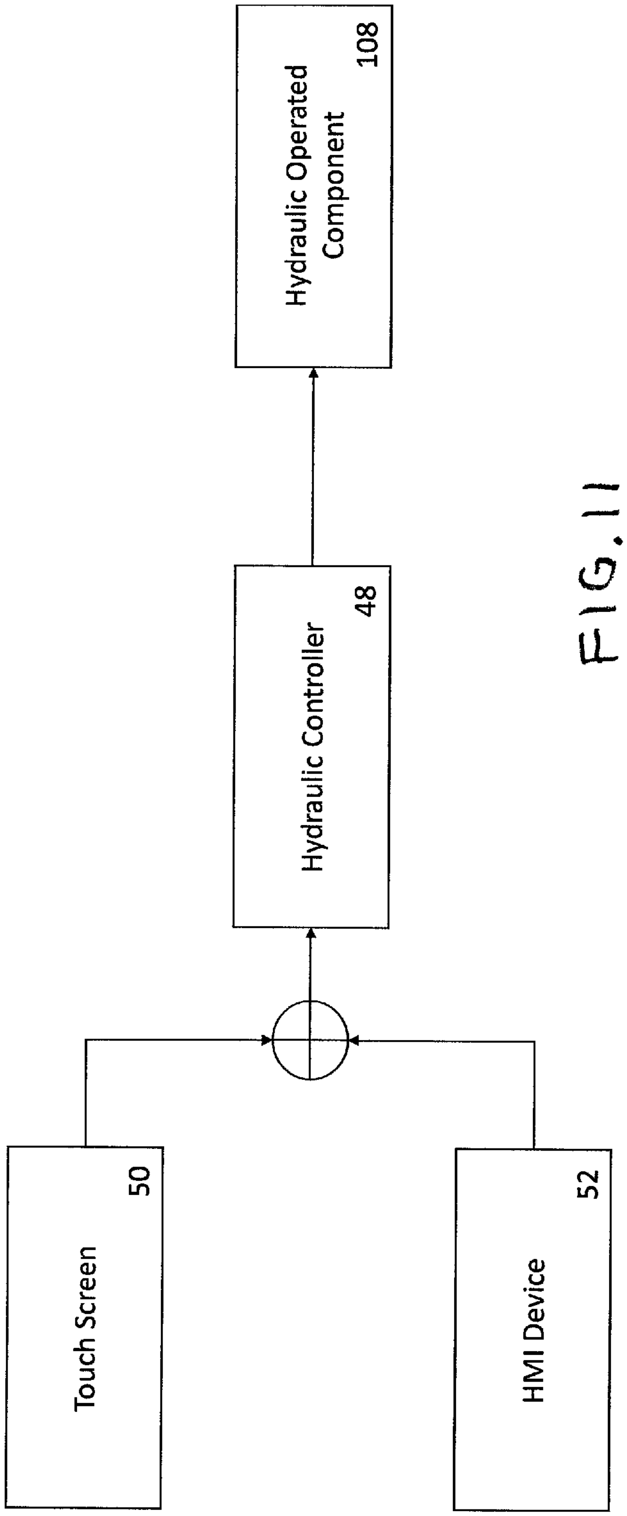
FIG. 11 is a schematic diagram illustrating how to reprogram a hydraulic controller to change the association of motions of an improved joystick with an excavator in accordance with the present invention.

FIG. 8 illustrates how left and right SAE joystick motion patterns control the motion of excavator elements. FIG. 9 illustrates how left and right ISO joystick motion patterns control the motion of excavator elements. FIG. 10 provides a list of preferred motions of the improved joystick 1 associated with motions of an excavator. However, the listed motions of the improved joystick 1 could be associated with different motions of the excavator. With reference to FIG. 11, the new association of motions could be made by reprogramming a hydraulic controller 48 through an input device, such as a cab touch screen 50 or a human-machine interface (HMI) device 52. The hydraulic controller 48 operates a hydraulic operated component, such as an excavator tool 108.

Figure 12:
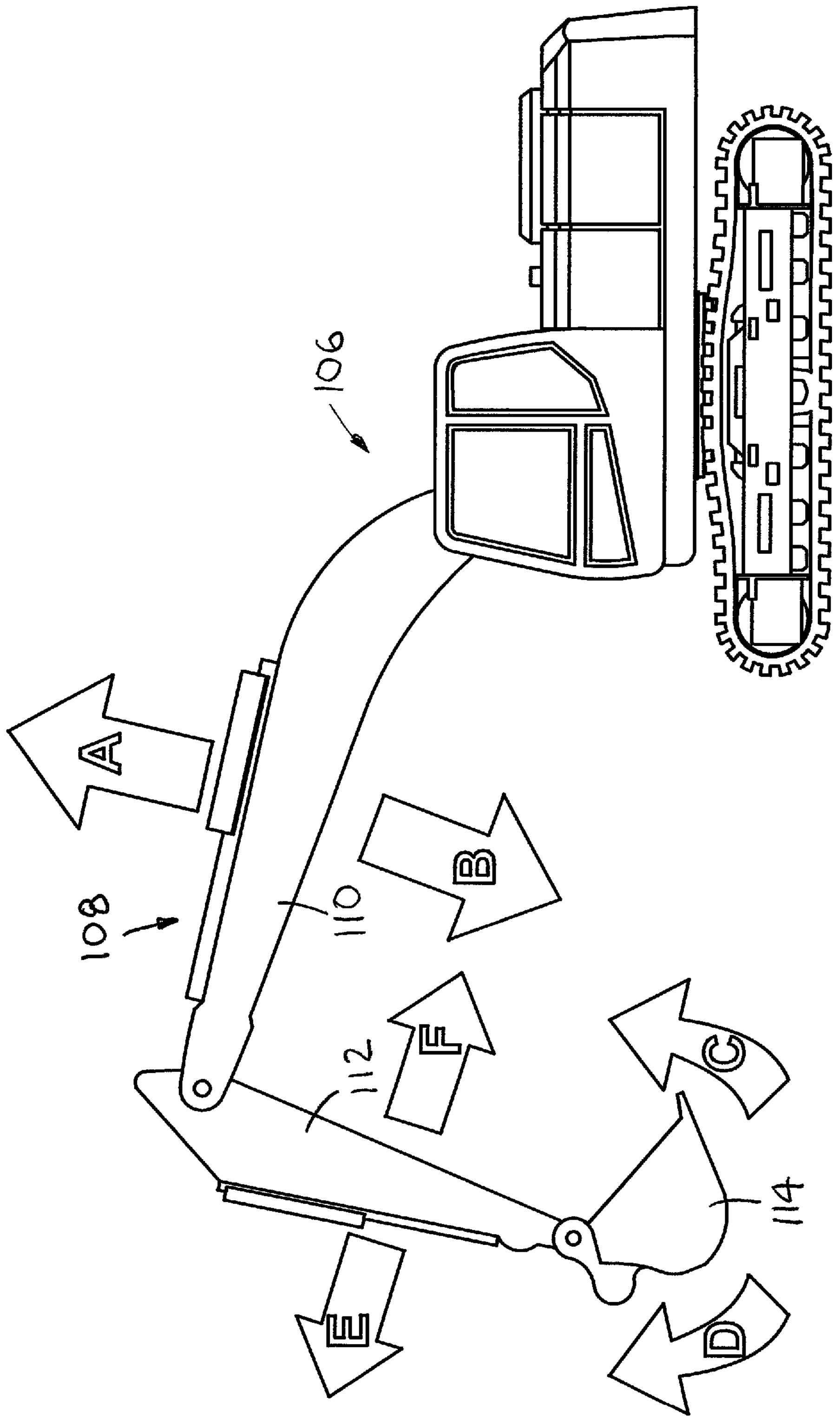
FIG. 12 is a side view of an excavator with labeled arrows that correspond to movements of an improved joystick in FIGS. 2-3 and a table in FIG. 10 to provide a pattern similar to SAE in accordance with the present invention.
Figure 14:
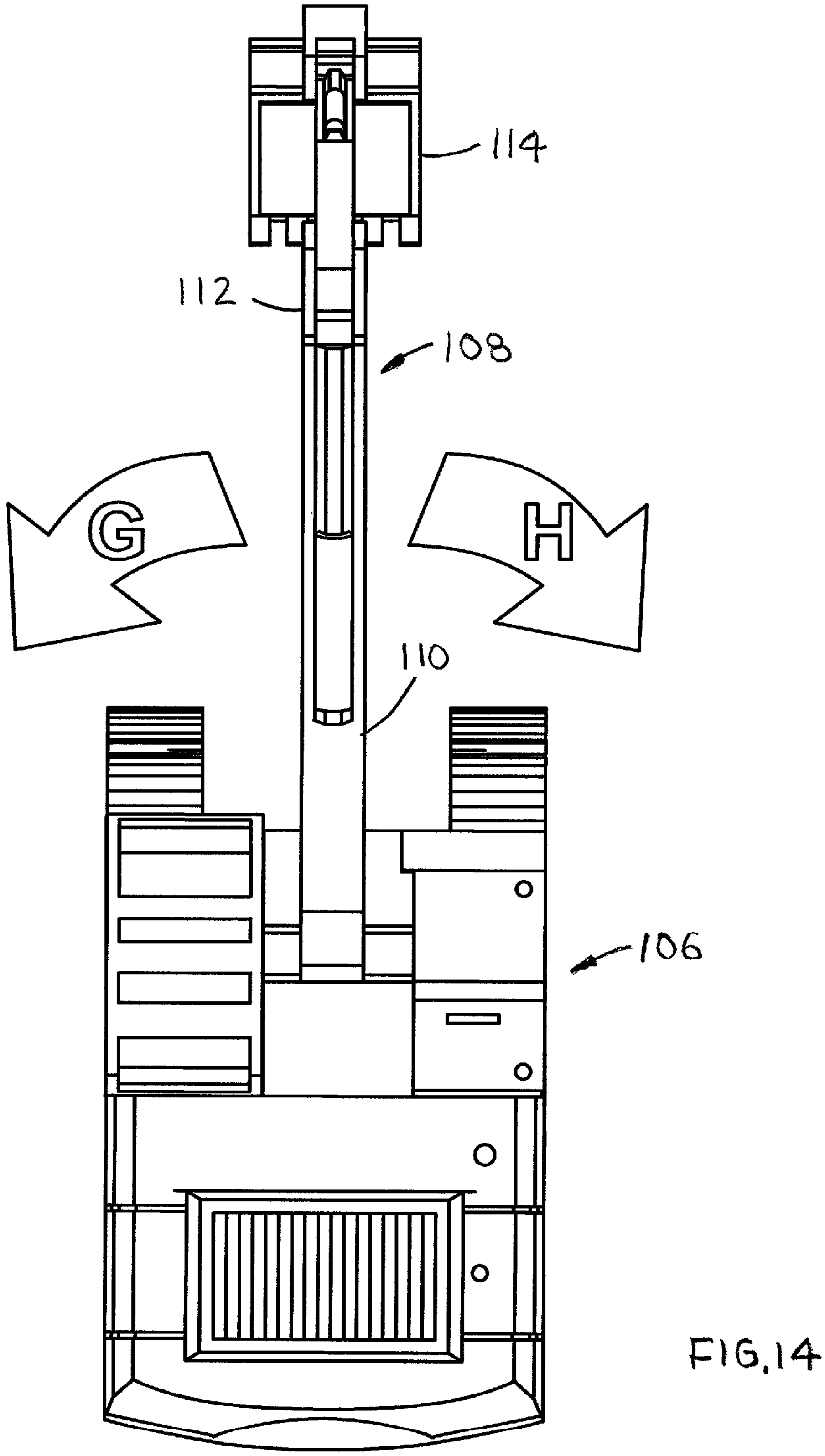
FIG. 14 is a top view of an excavator with labeled arrows that correspond to movements of an improved joystick in FIGS. 2-3 and a table in FIG. 10 in accordance with the present invention.

With reference to FIG. 12 in SAE mode, it is preferable to associate a downward hand curl “C” to a bucket 114 digging motion; and an upward hand curl “D” with a bucket 114 dump. It is preferable to associate a forearm forward push “E” to a stick 112 extension; and a forearm reward pull “F” to a stick retraction 112. With reference to FIG. 14, it is preferable to associate a hand movement to the left “G” to swinging the excavator 106 left; and a hand movement to the right “H” to swinging the excavator 106 right. It is preferable to associate a clockwise hand twist “A” to a boom 110 extension; and a counter clockwise hand twist “B” to a boom 110 retraction.

Figure 13:
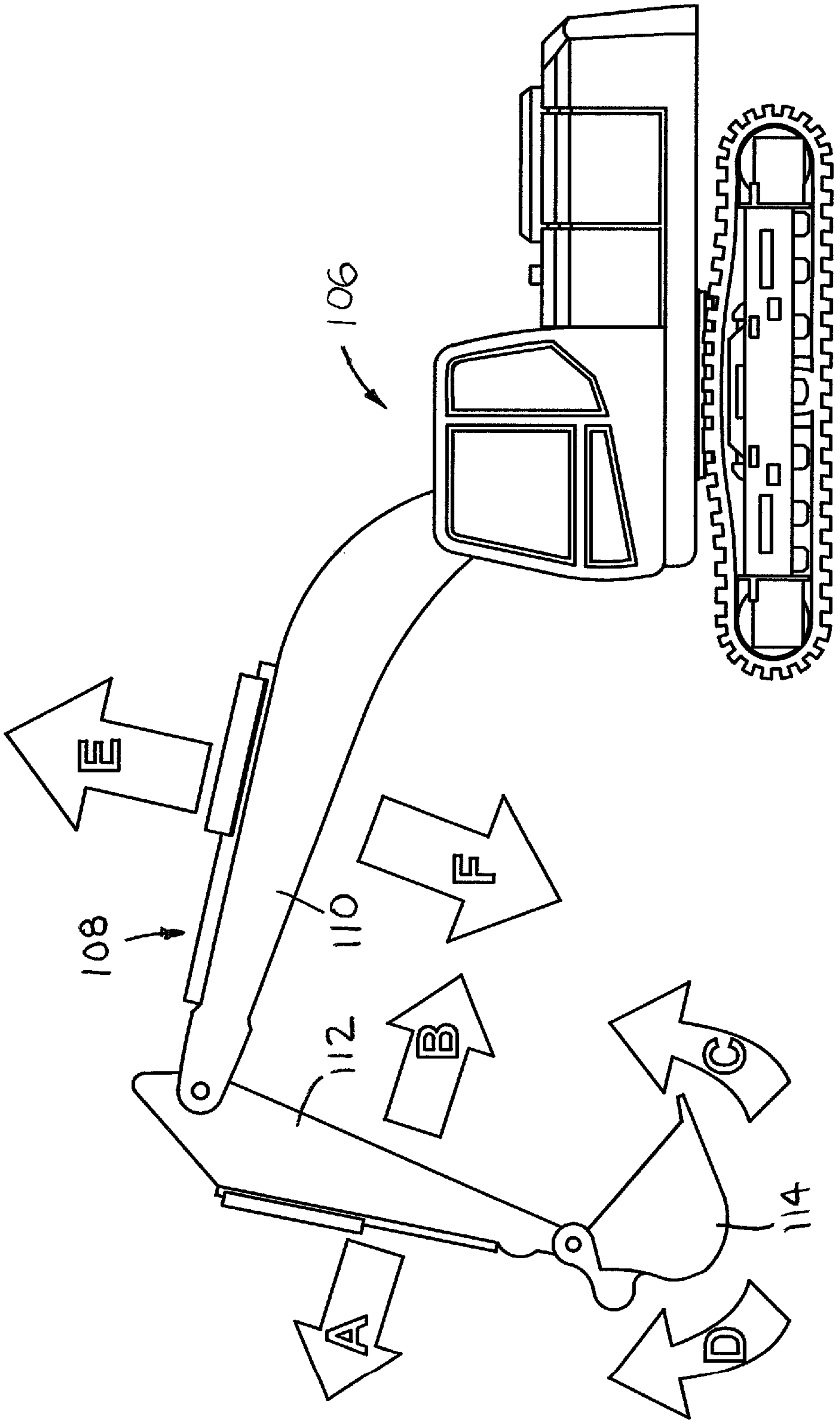
FIG. 13 is a side view of an excavator with labeled arrows that correspond to movements of an improved joystick in FIGS. 2-3 and a table in FIG. 10 to provide a pattern similar to ISO in accordance with the present invention.

With reference to FIG. 13 in ISO mode, it is preferable to associate a downward hand curl “C” to a bucket 114 digging motion; and an upward hand curl “D” with a bucket 114 dump. It is preferable to associate a forearm forward push “E” to a boom 110 extension; and a forearm reward pull “F” to a boom 110 retraction. With reference to FIG. 14, it is preferable to associate a hand movement to the left “G” to swinging the excavator 106 left; and a hand movement to the right "H" to swinging the excavator 106 right. It is preferable to associate a clockwise hand twist "A" to a stick 112 extension; and a counter clockwise hand twist "B" to a stick 112 retraction. However, the aforementioned hand and arm motions could be associated with other movements of the boom, stick and bucket through electrical switches and circuits in a harness to activate and deactivate different solenoids to perform the related functions.

A SAE/ISO pattern switch 54 is preferably located on the rotatable cylinder bar 26 for changing the operation to SAE or ISO. The SAE/ISO pattern switch uses electrical switches and circuits in a harness to activate and deactivate different solenoids to perform the related functions through an electrical hydraulic control system. An enable/disable switch 56 is used to deactivate electrical output from rotation of the rotatable ring 14, while allowing electrical output from the rotatable cylinder bar 26. The SAE/ISO pattern switch 54 and the enable/disable switch 56 may be implemented with any suitable push button switch. Entry of improved joystick 1 and excavator 106 motion associations in the hydraulic controller 48 through the cab touch screen 50 or HMI device 52 preferably over rides the SAE/ISO pattern switch 54 and the enable/disable switch 56.

Figure 1A:
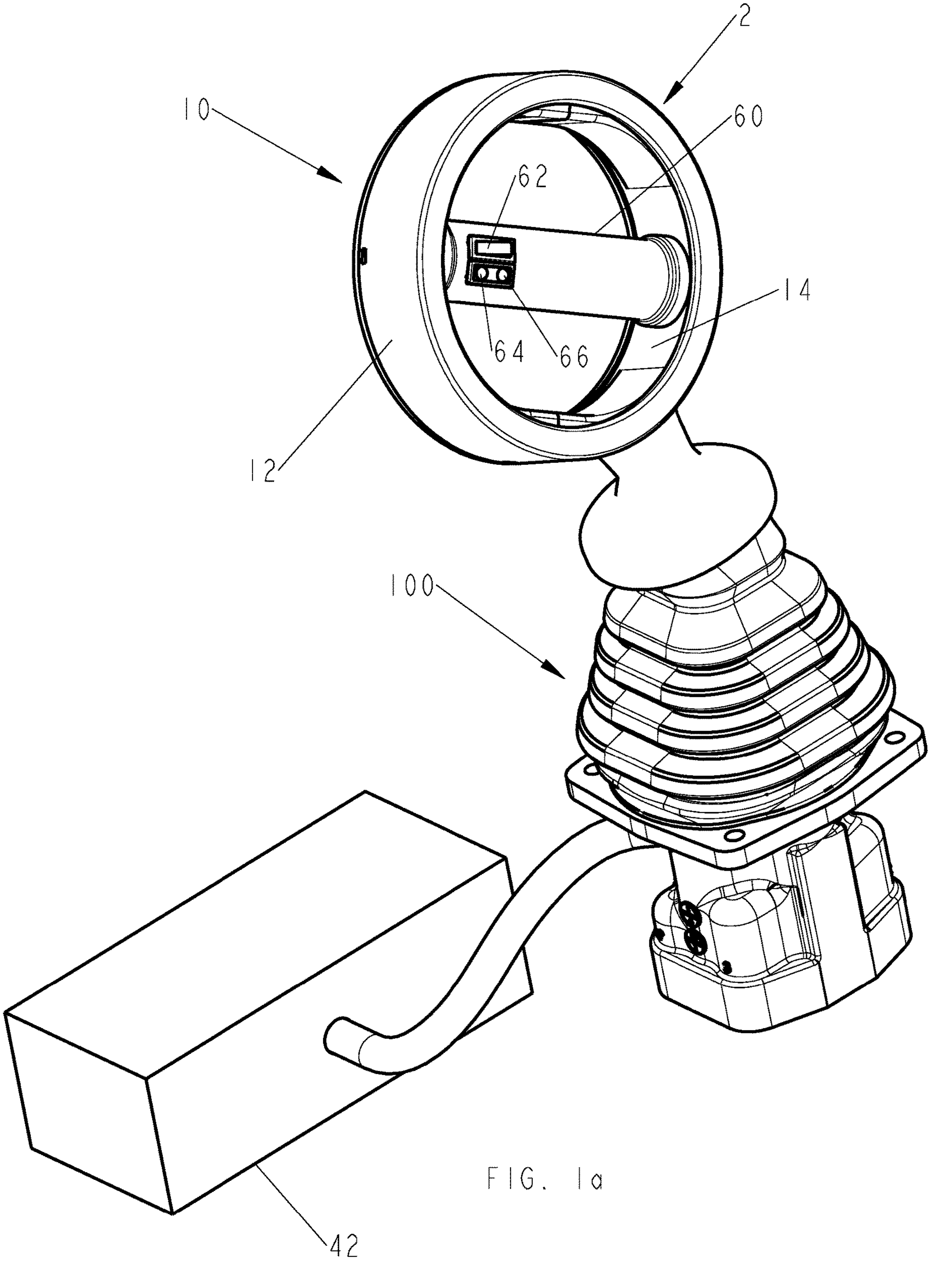
FIG. 1*a* is a front perspective view of a one-handed joystick for cranes in accordance with the present invention.
Figure 15:
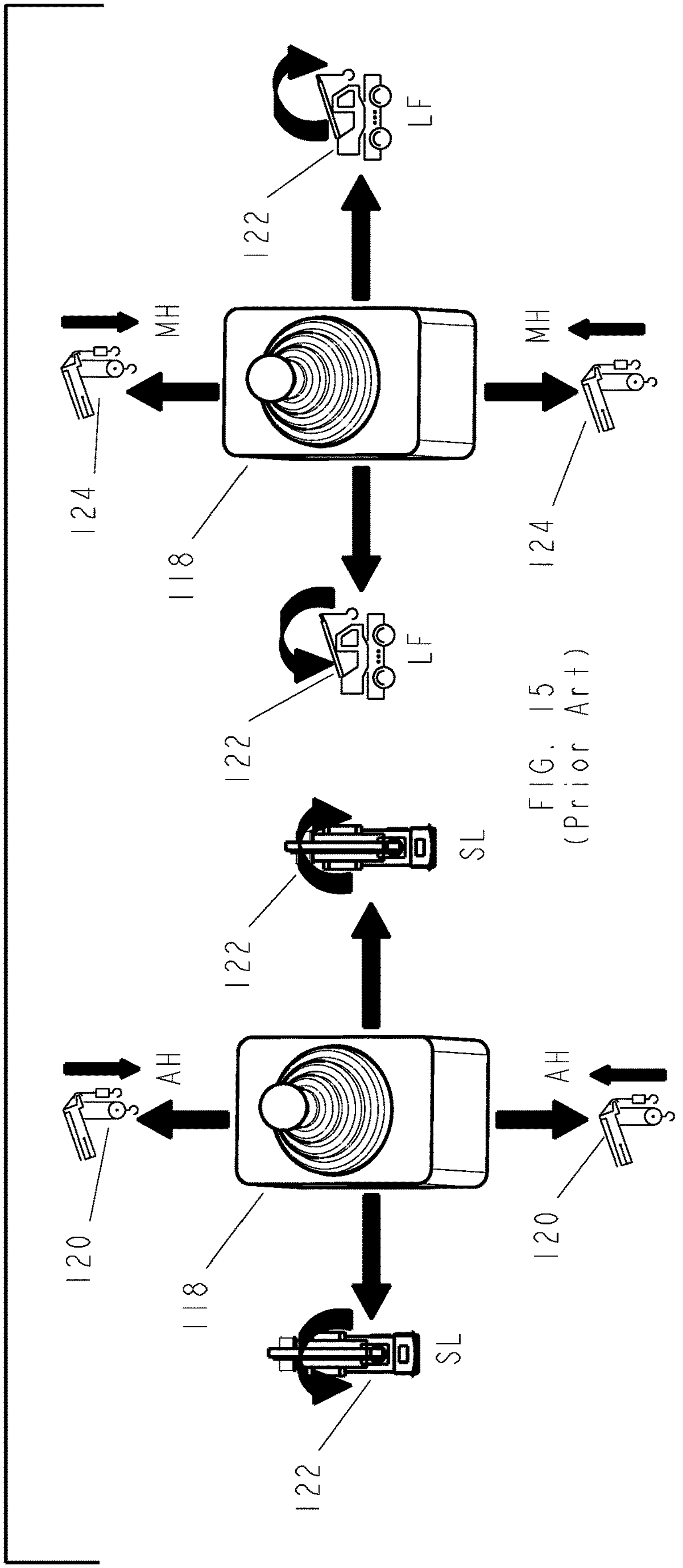
FIG. 15 (Prior Art)
FIG. 15 is a schematic diagram of two prior art joysticks and illustrations of various components of a crane operated by the two prior art joysticks.
Figure 16:
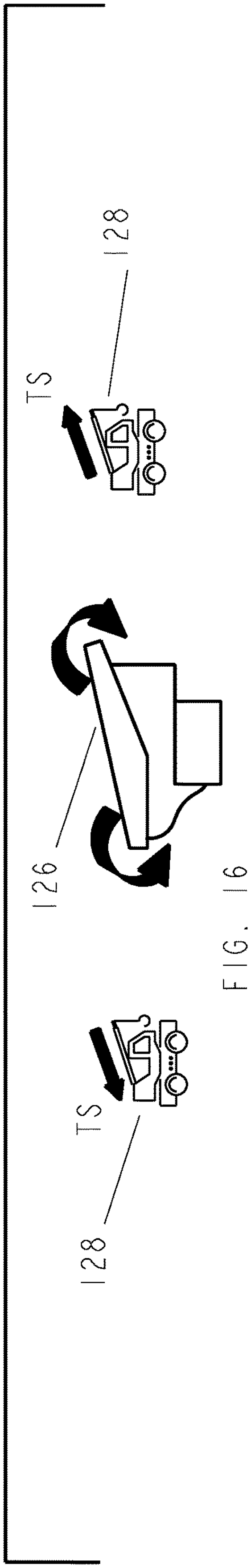
FIG. 16 (Prior Art)
FIG. 16 is a schematic diagram of a foot pedal for retracting and extending a telescoping crane boom of a crane and illustrations of an extended and retracted telescoping crane booms.

With reference to FIG. 1*a*, a one-handed joystick for cranes 2 allows an operator to make all the necessary motions with a single hand and arm for manipulating components of a crane. The one-handed joystick for cranes 2 includes a rotatable cylinder bar 60, the rotatable ring 14, the industrial joystick base 100, a rocker switch 62, a first push button switch 64 and a second push button switch 66. The rocker switch 62 preferably has three positions, which are retract, off and extend. FIG. 15 shows a schematic diagram of a first joystick 116 and a second joystick 118 and components of a crane that are operated by the two joysticks 116, 118. Forward and rearward movement of a first joystick 116 raises and lowers an auxiliary hoist 120. Left and right movement of the first joystick 116 slews a crane boom base 122 counterclockwise and clockwise. Forward and rearward movement of a second joystick 118 raises and lowers a main hoist 124. Left and right movement of the second joystick 118 luffs a crane boom 122 upward and downward. With reference to FIG. 16, a foot pedal 126 is shown with a telescoping crane boom 128. A rearward foot application to the foot pedal 126 results in the telescoping crane boom 128 being retracted. A forward foot application to the foot pedal 126 results in the telescoping crane boom 128 being extended.

Figure 17:
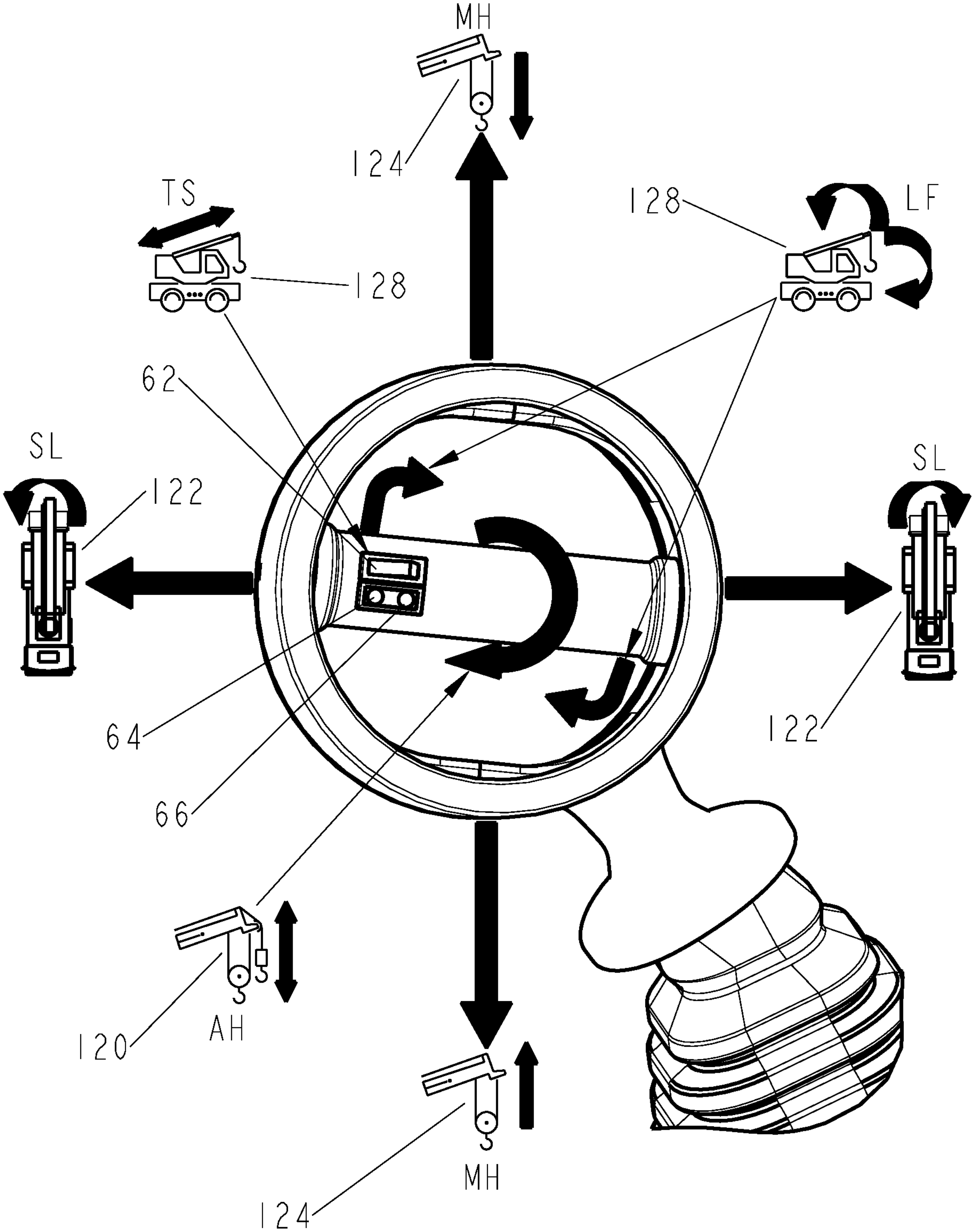
FIG. 17 is a schematic diagram of a one-handed joystick for a crane, which includes a graphical illustration of various components and how the various components are operated by a rotatable cylinder bar, a rotatable ring, a pivoting base, a rocker switch and two push button switches of the one-handed joystick for a crane in accordance with the present invention.

The following motion parameters are given by way of example and not by way of limitation. With reference to FIG. 17, the auxiliary hoist 120 is preferably raised by an upward hand curl of the rotatable cylinder bar 60 and lowered by a downward hand curl of the rotatable cylinder bar 60. Raising the telescoping boom 128 during luffing is preferably implemented by rotating the rotatable ring 14 in a counterclockwise direction and lowering the telescoping boom 128 during luffing is implemented by rotating the rotatable ring 14 in a clockwise direction. In an alternative embodiment, the rotatable cylinder bar 60 would not rotate, thus becoming a cylinder bar. The cylinder bar would allow the rotatable ring 14 to be rotated. The main hoist 124 is preferably raised by pivoting the industrial joystick base 100 rearward and the main hoist 124 is preferably lowered by pivoting the industrial joystick base 100 frontward.

Figure 1B:
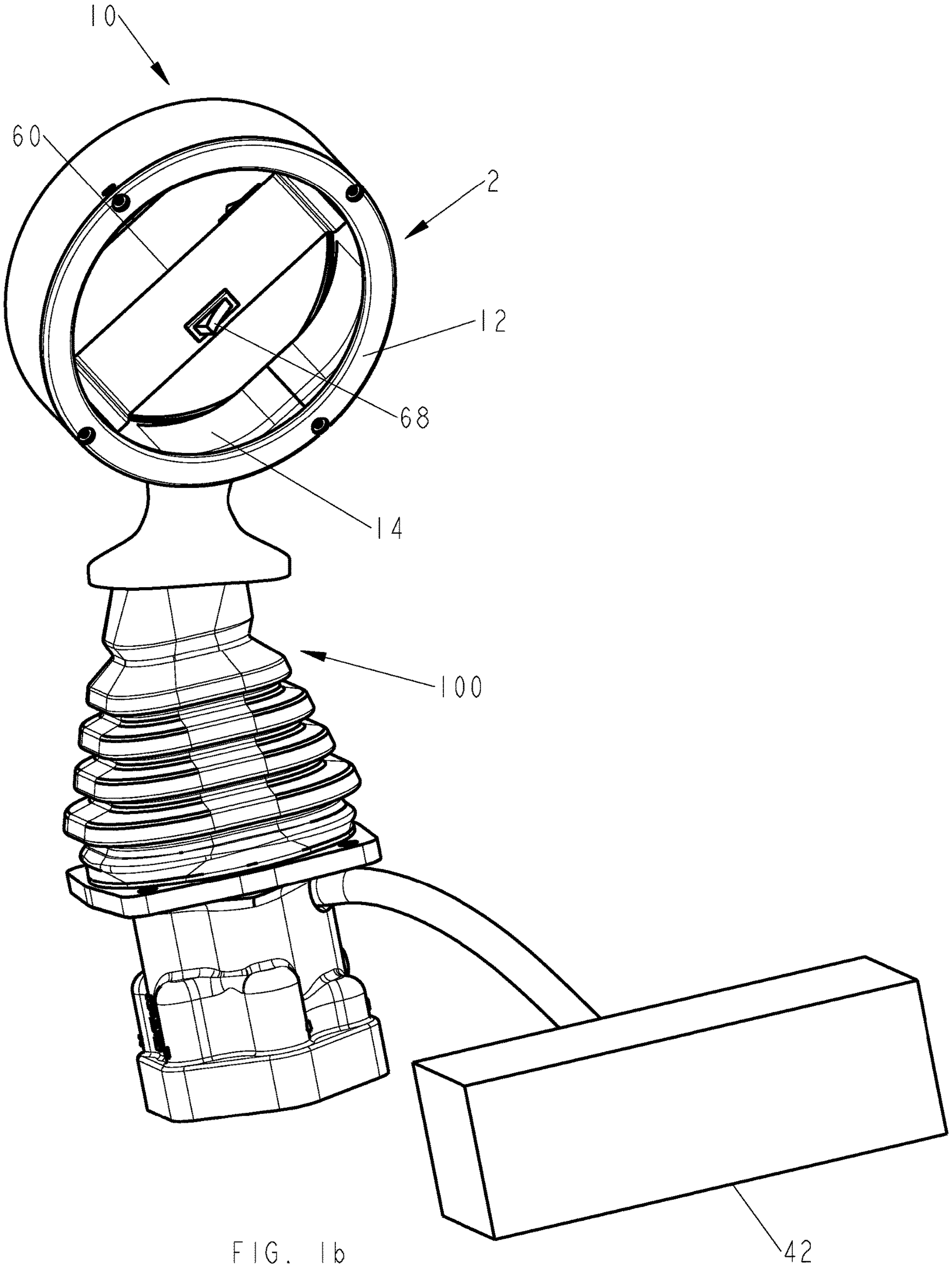
FIG. 1*b* is a rear perspective view of a one-handed joystick for cranes in accordance with the present invention.

Slewing the boom 122 in a counterclockwise motion is preferably implemented by pivoting the industrial joystick base 100 to the left. Slewing the boom 122 in a clockwise motion is implemented by pivoting the industrial joystick base 100 to the right. Extending the telescoping crane boom 128 is preferably implemented by toggling the rocker switch 60 from the off position to the extend position. Retracting the telescoping boom is implemented by toggling the rocker switch 60 from the off position to the retract position. Replacing the foot pedal 126 with the rocker switch 60 saves significant costs, including the foot pedal 126 and harness layout to the foot pedal 126 of the crane. The first push button switch 64 is preferably used to set a low-speed mode (first speed operation) for raising and lower the main hoist 124 and the auxiliary hoist 120. The second push button switch 66 is used to set a fast-speed mode (second speed operation) for raising and lowering the main hoist 124 and the auxiliary hoist 120. With reference to FIG. 1*b*, a Deadman's switch 68 is preferably located on a side opposite the rocker switch 62 and the push button switches 64, 66 on the rotatable cylindrical bar 60. However, it is preferable that the one-handed joystick for cranes 2 be programmable to allow different assignments of crane component motions to the motions of the rotatable cylinder ring 60, the rotatable ring 14 and the industrial joystick base 100.

To start operation of the one-handed joystick for a crane 2, a hand grasps the rotatable cylinder bar 60. The rotatable cylinder bar 60 may be rotated in opposite directions. The rotatable ring 14 may be rotated in clockwise or counterclockwise motions. The industrial joystick base 100 may be moved in front to back or left to right motions. Additionally, some critical safeties can be limited and guaranteed by the one-hand joystick for a crane 2. The one-handed joystick for a crane 2 can be operated an operator having only one hand, or someone who is paralyzed on one side of their body.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A joystick for operating at least three components of a crane, comprising:

a joystick base providing an electrical output for left, right, forward, and backward movements;

an outer base ring extends from a top of said joystick base, said left and right movements of said outer base ring are associated with moving a first component of the at least three components, said forward and backward movements of said outer base ring are associated with moving a second component of the at least three components;

an inner base ring is rotatably retained in an inner perimeter of said outer base ring; and a cylinder bar is retained in said inner base ring, said cylinder bar is sized to be grasped, wherein rotation of said inner base ring in one direction causes a third component of the at least one component to have a first movement, rotation of said inner base ring in an opposite direction causes the third component to have a second movement.

2. The joystick for operating at least three components of a crane of claim 1 wherein:

the first component is a boom base, the left and right movement of said joystick base is associated with rotating the boom base in either a clockwise or counterclockwise direction.

3. The joystick for operating at least three components of a crane of claim 1 wherein:

a rearward and forward movement of said joystick base is associated with a main hoist being extended or retracted.

4. The joystick for operating at least three components of a crane of claim 1 wherein:

a clockwise rotation and a counterclockwise rotation of said inner base ring is associated with luffing a hoist, while raising or lowering a boom of the crane.

5. The joystick for operating at least three components of a crane of claim 1 wherein:

a first switch for a first speed operation and a second switch for a second speed operation for extending or retracting the main hoist.

6. The joystick for operating at least three components of a crane of claim 1 wherein:

a Deadman's switch is retained on said cylinder bar.

7. A joystick for operating at least four components of a crane, comprising:

a joystick base providing an electrical output for left, right, forward, and backward movements;

an outer base ring extends from a top of said joystick base, said left and right movements of said outer base ring are associated with moving a first component of the at least four components, said forward and backward movements of said outer base ring are associated with moving a second component of the at least four components;

an inner base ring is rotatably retained in an inner perimeter of said outer base ring, wherein rotation of said inner base ring in one direction is associated with a first movement of a third component of the at least four components, rotation of said inner base ring in an opposite direction is associated with a second movement of the third component; and a rotatable cylinder bar is rotatably retained in said inner base ring, an axis of said rotatable cylinder bar is rotated relative to said inner base ring, said rotatable cylinder bar is sized to be grasped, wherein rotation of said rotatable cylinder bar in one direction is associated with a first movement of a fourth component of the at least four components, rotation of said rotatable cylinder bar in an opposite direction is associated with a second movement of the fourth component of the at least four components.

8. The joystick for operating at least four components of a crane of claim 7 wherein:

a rocker switch is retained on said rotatable cylinder bar, said rocker switch includes positions of retract, off and extend, a boom of the crane is retracted when said rocker switch is in a retract position, the boom of the crane is extended when said rocker switch is in an extend position.

9. The joystick for operating at least four components of a crane of claim 7 wherein:

a left and right movement of said joystick base is associated with rotating a boom base of the crane in either a clockwise or counterclockwise direction.

10. The joystick for operating at least four components of a crane of claim 7 wherein:

a downward hand curl and an upward hand curl of said rotatable cylinder bar is associated with a lowering or raising of an auxiliary hoist.

11. The joystick for operating at least four components of a crane of claim 7 wherein:

a first switch for a first speed operation and a second switch for a second speed operation for extending or retracting the main hoist.

12. The joystick for operating at least four components of a crane of claim 7 wherein:

a Deadman's switch is retained on said rotatable cylinder bar.

13. A joystick for operating at least four components of a crane, comprising:

a joystick base providing an electrical output for left, right, forward, and backward movements;

an outer base ring extends from a top of said joystick base, said left and right movements of said outer base ring are associated with moving a first component of the at least four components, said forward and backward movements of said outer base ring are associated with moving a second component of the at least four components;

a rotatable cylinder bar is rotatably retained in said outer base ring, an axis of rotation of said rotatable cylinder bar is perpendicular to an axis of said outer base ring, said rotatable cylinder bar is sized to be grasped, wherein rotation of said rotatable cylinder bar in one direction causes a third component of the at least four components to have a first movement, rotation of said rotatable cylinder bar in an opposite direction causes the third component to have a second movement; and a rocker switch is located on said rotatable cylinder bar, said rocker switch in one position causes a fourth component of the at least one component to have a first movement, said rocker switch in a second position causes the fourth component to have a second movement.

14. The joystick for operating at least four components of a crane of claim 13 wherein:

said rocker switch includes positions of retract, off and extend, a boom of the crane is retracted when said rocker switch is in the retract position, the boom of the crane is extended when said rocker switch is in the extend position.

15. The joystick for operating at least four components of a crane of claim 13 wherein:

a left and right movement of said joystick base is associated with rotating a boom base of the crane in either a clockwise or counterclockwise direction.

16. The joystick for operating at least four components of a crane of claim 13 wherein:

a rearward and forward movement of said joystick base is associated with a main hoist being extended or retracted.

17. The joystick for operating at least four components of a crane of claim 16 wherein:

a first switch for a first speed operation and a second switch for a second speed operation for extending or retracting the main hoist.

18. The joystick for operating at least four components of a crane of claim 16 wherein:

a Deadman's switch is retained on said rotatable cylinder bar.

19. The joystick for operating at least four components of a crane of claim 13 wherein:

a downward hand curl and an upward hand curl of said rotatable cylinder bar are associated with a lowering or raising of an auxiliary hoist.

* * * * *